(No Model.) 2 Sheets—Sheet 1.
F. B. HILL.
ICE MAKING, COOLING, AND REFRIGERATING APPARATUS.
No. 464,434. Patented Dec. 1, 1891.
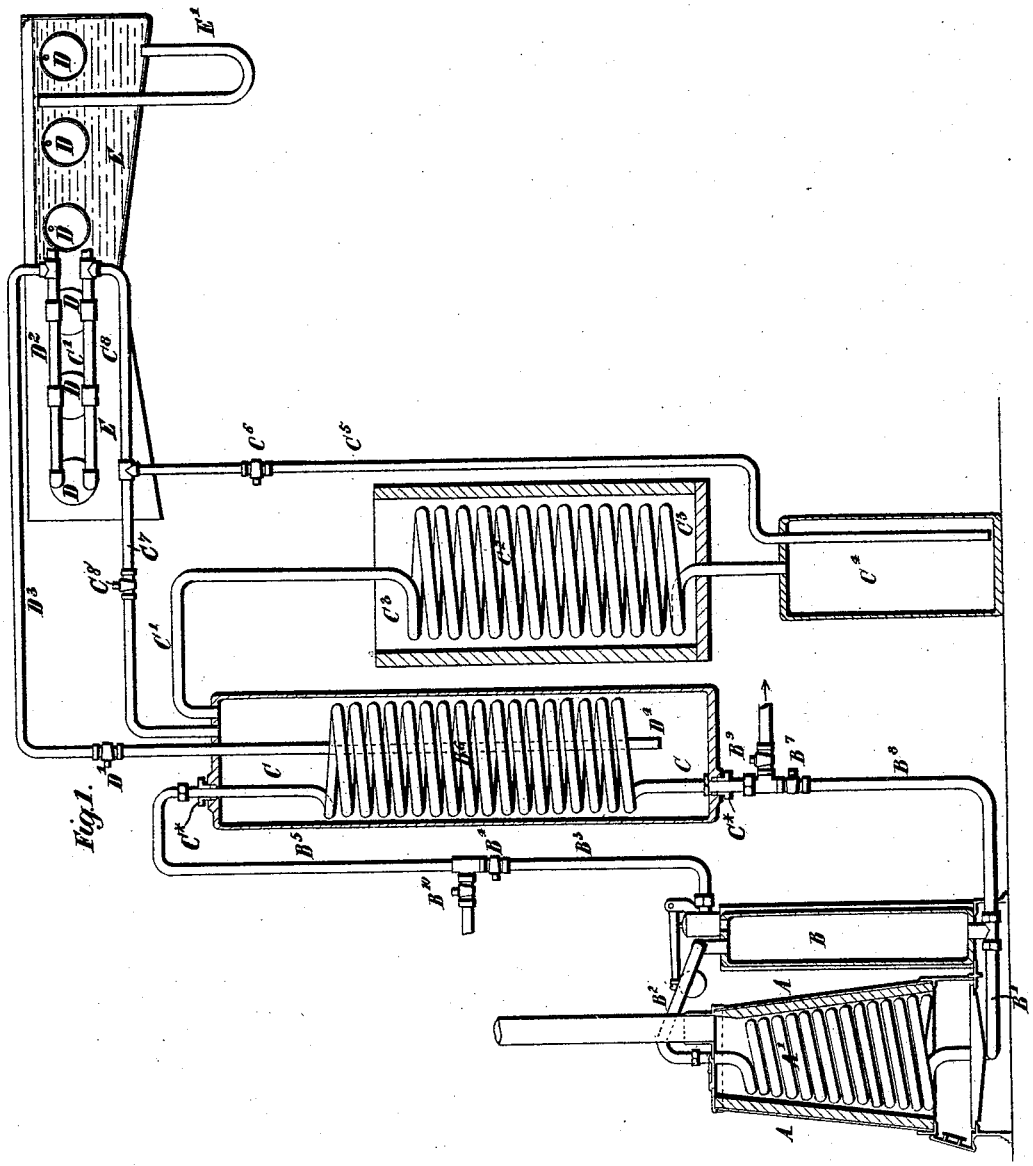
Witnesses.
J. A. Rutherford
Robert Pruett
Inventor:
Frederick B. Hill.
By James L. Norris,
Atty.

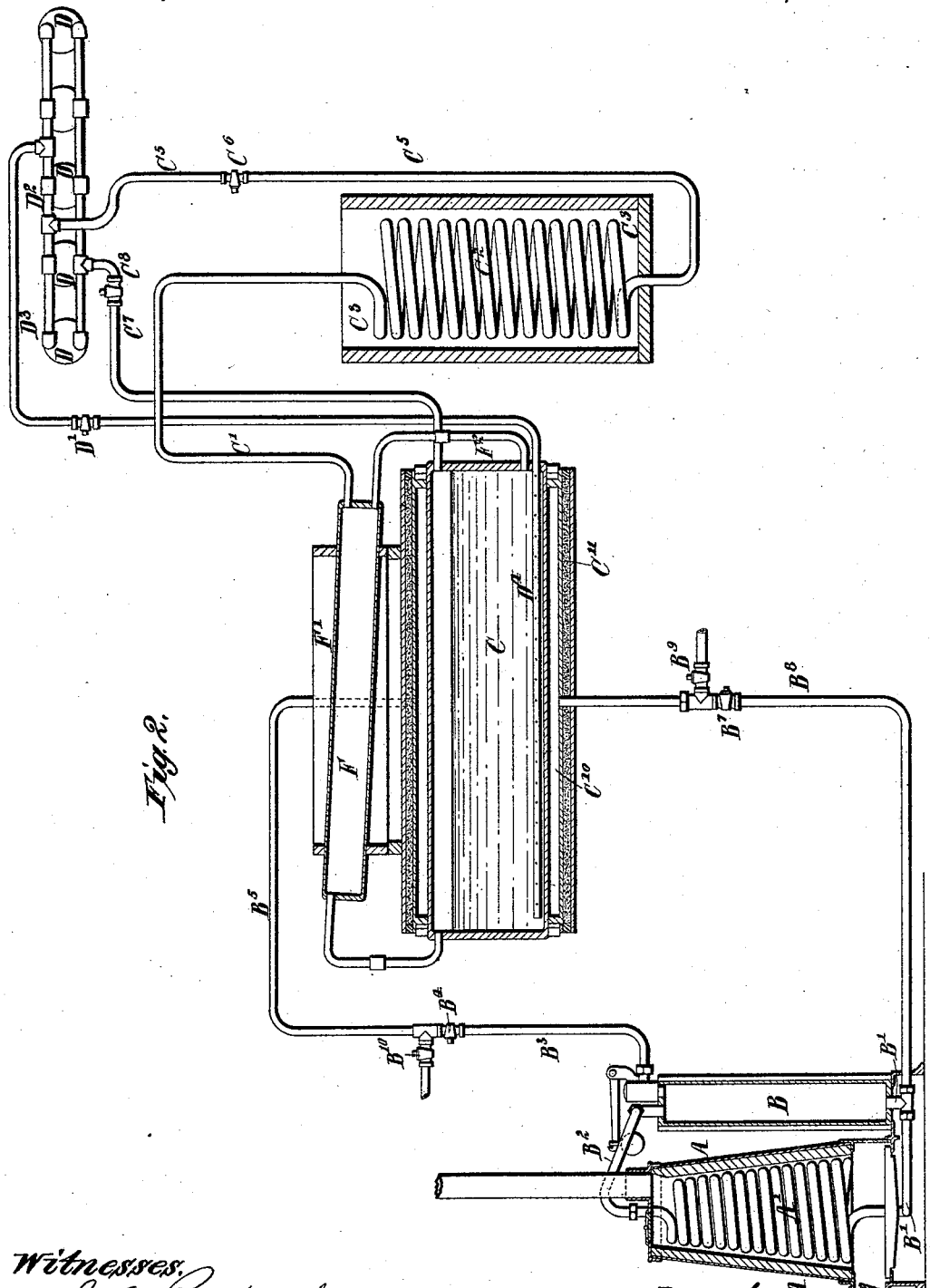

UNITED STATES PATENT OFFICE.

FREDERICK BARKER HILL, OF LONDON, ENGLAND, ASSIGNOR OF THREE-FOURTHS TO JAMES SINCLAIR, OF SAME PLACE.

ICE-MAKING, COOLING, AND REFRIGERATING APPARATUS.

SPECIFICATION forming part of Letters Patent No. 464,434, dated December 1, 1891.

Application filed December 27, 1888. Serial No. 294,749. (No model.) Patented in England December 6, 1886, No. 15,914.

*To all whom it may concern:*

Be it known that I, FREDERICK BARKER HILL, engineer, a subject of the Queen of Great Britain, and a resident of London, England, have invented certain new and useful Improvements in Ice-Making, Cooling, and Refrigerating Apparatus, (for which I have obtained a patent in Great Britain, No. 15,914, bearing date December 6, 1886,) of which the following is a specification, reference being had to the accompanying drawings.

My invention relates to apparatus for the production of cold for cooling rooms and for ice-making.

My said invention relates more particularly to that kind or class of refrigerating or ice-making apparatus wherein the cold is produced by first distilling and then expanding or re-evaporating and absorbing ammonia or other fluid of like properties.

Heretofore in many forms of refrigerating or ice-making machines the liquefied ammonia has been allowed to expand into the refrigerator, and in apparatus heretofore constructed for the purpose the pipes are so arranged that the ammonia or a portion thereof is liable to pass through the refrigerator in a liquid state and to return to the ammonia boiler or absorber without having performed its work.

In some methods of refrigeration heretofore adopted the ammonia evaporated from a strong solution thereof is collected and liquefied in a receiver or refrigerating-chamber, from which, when the impoverished solution is cooled, the ammoniacal gas returns to the said solution; but in all such methods the return of the ammoniacal gas is uncontrolled, and consequently when the impoverished solution is cooled the whole of the ammonia expands and returns to the said solution, so that a great degree of cold is produced in a short space of time, and the temperature will rise very considerably during the process of again heating the ammonia solution, collecting the liquid ammonia in the refrigerating-chamber, and cooling the impoverished solution. It is obvious, therefore, that with such methods a uniform low temperature cannot be maintained.

Now my invention comprises an improved method or process of refrigeration whereby I am enabled to maintain a uniform low temperature for a very long period and to store cold in a large body of non-congealable liquid which is inclosed in a tank or vessel and in which the refrigerating tubes or chambers are immersed near the surface of the liquid, so that the liquid cooled thereby will descend and displace the liquid at the bottom of the tank or vessel and a circulation of the said liquid will take place within the said tank or vessel, and the cooling of the body of liquid will be very expeditiously effected.

My improved refrigerating process consists in first evaporating practically the whole of the ammonia from a solution thereof contained in a boiler or still, liquefying the said ammonia by passing it through a condenser and collecting the liquefied ammonia in the refrigerating tubes or chambers, and after the flow of the liquid ammonia to the said tubes or chambers has ceased cooling the impoverished solution in the boiler or still and controlling as required the return of the ammoniacal gas thereto from the said tubes or chambers—that is to say, instead of allowing the whole of the ammonia in the said tubes or chambers to evaporate and return to the boiler or still immediately the latter is cooled, the ammonia is retained in the refrigerating tubes or chambers, and is only allowed to evaporate and return to the boiler or still from time to time in greater or less quantity, so as to reduce the temperature, as may be required. The production of cold can therefore be deferred for any desired length of time after the cooling of the impoverished solution. I prefer to so arrange the tank or vessel inclosing the non-congealable liquid that the bottom thereof will form the ceiling of the room or chamber to be cooled. There will thus be automatically maintained in the said room or chamber a constant circulation of the air as its heat is abstracted by the tank or reservoir of brine falling to the bottom of the said chamber and displacing the air of higher temperature, which in turn comes into contact with the under surface of the tank. The air in the chamber is therefore dried and kept in a very favorable condition for purposes for which it is required. By my improvements I am enabled to store up in the said brine a great amount of cold sufficient to maintain the desired low temperature in the cooling-chamber for some days, whether the said chamber be kept closed or be opened occasionally, any additional heat that may be imparted to the chamber while the door is open being very soon absorbed by the cold in the storage-tank when the door is again closed. Moreover, by redistilling the anhydrous ammonia after the brine has been cooled thereby and allowing it to lie in the refrigerating pipes or chambers until the temperature shows signs of rising and then allowing any required quantity of it to expand or re-evaporate from time to time I can maintain the desired degree of cold in the chamber for many days without again applying heat to the ammonia-boiler. This is important, as it allows time for the boiler to lose its heat by radiation, and thus saves the cooling-water that would otherwise be required.

Another part of my said invention consists in providing means whereby any impoverished ammonia solution which cannot be removed from the refrigerator pipes or chambers by evaporation may be allowed to return by gravity to the ammonia-boiler.

In the accompanying drawings I have shown how my said invention may be conveniently and advantageously carried into practice.

Figure 1 is a sectional side elevation showing one form of my improved apparatus in which the refrigerator-tubes are arranged horizontally and the ammonia boiler and condenser are arranged vertically. Fig. 2 is a longitudinal central section of another form or modification of my improved apparatus.

A is a slow-combustion stove provided with a coil $A'$, having a large heating-surface for the rapid formation of steam.

B is a steam and water separator, which is connected with the lower end of the said coil by a pipe $B'$ and with the upper end of the said coil by a pipe $B^2$.

C is the ammonia-boiler.

$B^3$ is a pipe extending upward from the separator B and provided with a cock $B^4$. This cock is connected by a pipe $B^5$ with the upper end of a coil $B^6$, for the purpose of heating the ammonia solution to distill the ammonia. The said coil $B^6$ is inserted in the ammonia-boiler C prior to the welding of the ends in the tubular or cylindrical portion thereof, the ends of the said coil passing through stuffing-boxes $C^*$ in the ends of the boiler.

$B^8$ is a pipe connecting the lower end of the coil $B^6$ with the lower end of the separator B. This pipe is provided with a stop-cock $B^7$.

$B^9$ $B^{10}$ are pipes provided with suitable cocks and connected, respectively, with the pipes $B^5$ and $B^8$, for the purpose of circulating cold water or air through the coil $B^6$ to cool the ammonia solution contained in the boiler C after the distillation. The air would circulate by gravity, the said air as it becomes heated in the coil $B^6$ ascending therein and being replaced by the cooler air from without.

$C'$ is a pipe connected with a coil $C^2$, which is inclosed in a tank $C^3$ for containing cold water. This coil is connected at its lower end with a liquid-ammonia receiver $C^4$.

D D are the refrigerating tubes or chambers, which are connected with the liquid-ammonia receiver $C^4$ by means of a pipe $C^5$, provided with a cock $C^6$. This pipe is also connected with the top of the ammonia-boiler by a pipe $C^7$, provided with a cock $C^8$. The refrigerating tubes or chambers D are also connected by means of pipes $D^2$ $D^3$ and a cock $D'$ with a pipe $D^4$, extending nearly to the bottom of the ammonia-boiler.

E is a tank for containing a large quantity of brine or other non-congealable liquid, in which are immersed the refrigerating tubes or chambers D.

The apparatus above described operates as follows, viz: The stove A is filled with fuel, which is ignited, and the coil $A'$ is thus heated, so that steam is formed and is forced into the separator B, in which any water passing over with the steam falls by gravity. This water again enters the coil $A'$ through the pipe $B'$, while the steam passes up the pipe $B^3$. The ammonia-boiler C being nearly filled with a strong solution of ammonia, the cocks $B^4$ $B^7$ are opened, thus permitting the steam to circulate through the coil $B^6$. The steam coming in contact with the cold surface of this coil condenses and flows down by gravity through the cock $B^7$ and pipes $B^8$ $B'$ into the coil $A'$ to be again formed into steam, thus insuring a rapid circulation of the water through the coil $A'$ and enabling the heater to be placed practically on the same level as the ammonia-boiler. The heat applied to the ammonia through the coil $B^6$ causes the distillation of the ammonia, so that it is driven off in the form of gas through the pipe $C'$ into the coil $C^2$, where by its own accumulation of pressure, due to the application of heat, and by the abstraction of its sensible heat by the cold water in the tank $C^3$ it is liquefied and flows down into the liquid-ammonia receiver $C^4$. This receiver is made of sufficient capacity to contain the whole of the pure liquid anhydrous ammonia. The object in employing this receiver is to prevent the carrying of the heat of the liquid ammonia to the refrigerator. The cock $C^6$ being opened, the liquid from the receiver $C^4$ is forced up through the pipe $C^5$ into the refrigerating tubes or chambers D. The cock $C^6$ is closed as soon as this liquid is all forced up into the said tubes or chambers D, which is known by the noise made by the gas when commencing to follow the liquid. The cocks $B^4$ $B^7$ are then closed and cold water or air is allowed to pass through the coil $B^6$ by opening the cocks $B^9$ $B^{10}$. By this means the weak solution in the boiler is cooled and the pressure in the said boiler is diminished. Upon opening the cock $D'$ the ammonia in the refrigerator-tubes D vaporizes and returns from the said tubes in the form of gas through the pipes $D^2$, $D^3$, and $D^4$ into the ammonia-boiler C, in which it ascends through the weak ammonia solution and is thereby absorbed. By the expansion of the ammonia in the said tubes D a large amount of heat is abstracted from the non-congealable liquid in the tank E. The said liquid may thus be cooled to a temperature many degrees below zero (Fahrenheit.)

As the bottom of the tank E forms the ceiling of the room to be cooled, and the coldest portion of the non-congealable liquid will always descend to the bottom of the said tank, while the hottest air in the room will always rise to the top of the said room, an exchange of temperature will take place and a circulation of the said liquid in the tank and of the air in the room will be maintained, thus keeping the room at a uniform or nearly uniform temperature in every part thereof. To increase the amount of cooling-surface when required, I sometimes employ U-shaped tubes E' in combination with the tank E.

By attaching ordinary ice-boxes to the refrigerating apparatus shown in Fig. 1 ice may be very conveniently and rapidly made, either by the direct expansion of the ammonia or by the circulation of the cold non-congealable liquid.

It will be seen that in my apparatus I provide for introducing into each of the refrigerator-tubes a large quantity of liquid ammonia. This liquid ammonia can be allowed to expand in the said tubes, as above described, thus reducing the temperature of the non-congealable liquid to a very low degree. I can then, if desired, redistill the ammonia into the tubes D and allow it to remain there in a liquid state until the temperature of the room commences to rise. Then the liquid in the boiler having in the meantime been cooled, the cock D' can be opened and the liquid ammonia in the tubes D, or a portion thereof, as may be required, allowed to expand, thus again reducing the temperature of the non-congealable liquid. It is obvious that by these means I obtain a large reservoir or store of cold which will maintain a reduced temperature in the said room for many days without the necessity of again heating the ammonia solution in the boiler. Moreover, by the construction of the apparatus in the manner above described I can cause any impoverished liquid which cannot be evaporated by expansion in the tubes D to return to the boiler C by gravity, thus avoiding the accumulation of such impoverished liquid in the said tubes. For this purpose I connect the tubes or chambers D at or near the bottom thereof with the ammonia boiler or still C by means of a pipe $C^7$, provided with a cock or valve $C^8$.

By constructing the ammonia boiler or still of a hollow cylinder or tube with the ends welded therein after the coil $B^6$ has been inserted I provide very effectually for diminishing the liability to leakage of the ammonia.

In the apparatus shown in Fig. 2 the ammonia-boiler C is provided with a steam-jacket $C^{10}$ for heating it, or it may be heated by internal pipes, and the said jacket is covered with any suitable non-conducting material, as at $C^{11}$. In combination with the boiler C, I arrange a rectifier F for separating from the ammoniacal gas any steam that may be carried forward therewith. This rectifier is placed in a small tank F', filled with water to condense the steam. The temperature of this water, however, is higher than that of the water around the coil for liquefying the ammoniacal gas. The water returns from the rectifier F to the boiler C through the pipe $F^2$ and the ammoniacal gas passes to the condenser or liquefying-coil through the pipe C'.

It is evident that the tank E of non-congealable liquid can, if desired, be dispensed with, as in the apparatus shown in Fig. 2, in which case the refrigerating tubes will abstract the heat directly from the air in the room. It is much more advantageous, however, to retain the said tank. If desired, the pipe $C^5$ may conduct the liquid ammonia into the refrigerator-tubes through the pipe $D^2$, as shown in Fig. 2. The ammonia cannot then return in a liquid state to the ammonia-boiler. I can, moreover, if desired, dispense with the liquid-ammonia receiver $C^4$ and connect the lower end of the coil $C^3$ directly to the pipe $C^5$ or $D^2$, as shown, for instance, in Fig. 2. The refrigerator tubes or chambers D are, however, made of sufficient capacity to contain the whole of the liquid anhydrous ammonia. Moreover, I can employ means other than those above described for heating the ammonia-boiler.

The slow-combustion stove arranged in combination with the coil for heating the ammonia-boiler is very advantageous, inasmuch as the fuel can be allowed to remain ignited during the reabsorption of the ammonia, and a very small quantity of fuel is required. A saving is therefore effected in respect of both fuel and labor. Moreover, the circulation of the water through the heater takes place very rapidly, the water condensed within the coil in the ammonia-boiler falling by gravity and returning to the lower part of the coil in the stove. The further advantage is also gained that the apparatus can be used where an ordinary steam-boiler is not available.

It is obvious that two or more ammonia-boilers constructed as above described can be used with a single slow-combustion stove and separator, so that while the heating of the ammonia is being effected in one boiler the cooling of the liquid or the reabsorption of ammonia can be proceeded with in another boiler.

What I claim is—

1. The improved refrigerating process, consisting in first evaporating practically the whole of the ammonia from a solution thereof, dehydrating the said ammonia, and liquefying the same by passing it through a condenser, and collecting the liquid ammonia in suitable refrigerating tubes or chambers, and, after the flow of the liquid ammonia to the said tubes or chambers has ceased, cooling the impoverished solution and then controlling as required the expansion of the ammonia in the said tubes or chambers and the return of the ammoniacal gas therefrom to the said solution, substantially as and for the purpose specified.

2. The improved refrigerating process, consisting in first evaporating practically the whole of the ammonia from a solution thereof, dehydrating the said ammonia, and liquefying the same by passing it through a condenser, and collecting the liquid ammonia in suitable refrigerating tubes or chambers immersed in uncongealable liquid inclosed in a tank or vessel, and, after the flow of the liquid ammonia to the said tubes or chambers has ceased, cooling the impoverished solution and then controlling as required the expansion of the ammonia in said tubes or chambers and the return of the ammoniacal gas therefrom to the said solution, substantially as and for the purpose specified.

3. The improved refrigerating process, consisting in first evaporating practically the whole of the ammonia from a solution thereof, dehydrating the said ammonia and liquefying the same by passing it through a condenser, collecting the liquefied ammonia in suitable refrigerating tubes or chambers immersed in non-congealable liquid inclosed in a tank or vessel, and, after the flow of liquid ammonia to the said tubes or chambers has ceased, cooling the impoverished solution and permitting the expansion of the ammonia in the said chambers and the return of the ammoniacal gas thereto from the said tubes or chambers, and thereby greatly reducing the temperature of the non-congealable liquid, then again evaporating practically the whole of the ammonia from the said solution, liquefying the said ammonia, and collecting and retaining the same in the said tubes or chambers, and permitting and controlling as required the expansion of the ammonia in the said chambers and the return of the ammoniacal gas therefrom to the said solution, substantially as and for the purposes specified.

4. In an apparatus for producing cold by the intermittent ammonia-absorption process, the combination, with the ammonia boiler or still and a condenser or liquefier connected therewith, of a refrigerator consisting of tubes or chambers adapted to contain and store practically the whole of the liquid anhydrous ammonia from the said boiler or still, and provided with pipes, one of which conducts the liquid ammonia to the said tubes or chambers, and the other of which connects the space above the level of the liquid in the said tubes or chambers with the said boiler or still, and permits the return of vaporized ammonia to the boiler or still while preventing the return thereto of any liquid ammonia, and cocks or valves for regulating or controlling the flow of the liquid ammonia to and of the ammoniacal gas from the said tubes or chambers, substantially as hereinbefore described, and for the purposes specified.

5. In an apparatus for producing cold by the intermittent ammonia-absorption process, the combination, with a boiler or still and a condenser or liquefier connected therewith, of a refrigerator consisting of tubes or chambers adapted to contain and store practically the whole of the liquid anhydrous ammonia from the boiler or still, and provided with a pipe which connects the space above the level of the liquid in the refrigerator with the said boiler or still, and which permits the return of vaporized ammonia to the boiler or still while preventing the return thereto of any liquid ammonia, and with another pipe which connects the space below the level of the liquid in the refrigerator with the said boiler or still, and through which any impoverished ammonia solution which may be left in the refrigerator will return by gravity to the boiler, for the purposes above specified.

6. In an apparatus for the production of cold by the intermittent ammonia-absorption process, the combination, with the boiler or still and a condenser or liquefier connected therewith, of a receiver for the liquid ammonia connected with the said liquefier, a refrigerator consisting of tubes or chambers which are adapted to contain practically the whole of the liquid anhydrous ammonia from the said boiler or still and which are arranged above the level of the said boiler or still, a pipe connecting the said tubes or chambers with the said receiver, and pipes respectively connecting the spaces above and below the level of the liquid in the said tubes or chambers with the said boiler or still, substantially as and for the purposes set forth.

7. In an apparatus for the production of cold by the intermittent ammonia-absorption process, the combination, with an ammonia boiler or still, of a coil-boiler for heating the water, situated at a lower level than the said ammonia boiler or still and connected at its upper and lower ends with the top and bottom thereof, whereby the water will fall by gravity from the said ammonia boiler or still and will return to the said coil boiler, substantially as and for the purposes set forth.

8. In an apparatus for the production of cold by the intermittent ammonia-absorption process, the combination, with an ammonia boiler or still, of a coil boiler for heating the water, situated at a lower level than the ammonia boiler or still, and a separator connected at its upper and lower ends with corresponding ends of the said coil boiler and with the top and bottom of the ammonia boiler or still, whereby any water carried with the steam from the said coil-boiler will fall by gravity in the said separator and return to the said coil-boiler, and the water of condensation will fall by gravity from the ammonia boiler or still and return to the said coil boiler, substantially as and for the purpose set forth.

9. The combination of a refrigerator consisting of tubes or chambers adapted to contain and store, practically, the whole of the liquid anhydrous ammonia from the boiler or still, a pipe for conducting the liquefied ammonia into the said tubes or chambers, pipes respectively connecting the spaces above and below the level of the liquid ammonia in the said tubes or chambers with the said boiler or still, and a tank containing uncongealable liquid, in which the said refrigerating tubes or chambers are immersed near the surface of the liquid and which forms a reservoir or store of cold, the bottom of the said tank forming the top or ceiling of the room or chamber to be cooled, substantially as and for the purpose set forth.

10. In an apparatus for the production of cold by the ammonia-absorption process, the combination of an ammonia boiler or still C, a condenser or liquefier $C^2$, connected with the upper end of the said boiler or still, tubes or chambers D, arranged above the level of the said boiler or still and adapted for the reception of practically the whole of the liquid anhydrous ammonia therefrom, a pipe $C^5$ for conducting the liquefied ammonia into the said tubes or chambers, a pipe $D^2 D^3 D^4$, connecting the space above the level of the liquid in the said tubes or chambers with the said boiler or still, and a pipe $C^7$ for the return of any impoverished ammoniacal solution by gravity from the said tubes or chambers to the boiler or still, the said pipes being provided with suitable cocks or valves, substantially as and for the purposes set forth.

11. In an apparatus for the production of cold by the intermittent ammonia-absorption process, the combination of an ammonia boiler or still C, a condenser comprising a coil $C^2$, the upper end of which is connected with the upper end of the said boiler or still, a liquid-ammonia receiver $C^4$, connected at its upper end with the lower end of the said coil $C^2$, a refrigerator comprising tubes or chambers D, arranged above the level of the said boiler or still and adapted to contain practically the whole of the liquid ammonia therefrom, a pipe $C^5$, connecting the lower end of the said receiver with the said tubes or chambers D and provided with a cock or valve $C^6$, pipes $D^2 D^3 D^4$, connecting the space above the level of the liquid in the said tubes or chambers with the lower end of the said boiler or still and provided with a cock or valve $D'$, and a pipe $C^7$, connecting the lower part of the tubes or chambers D with the boiler or still and provided with a cock or valve $C^8$, all substantially as and for the purposes set forth.

12. In an apparatus for the production of cold by the intermittent ammonia-absorption process, the combination of an ammonia boiler or still C, a condenser comprising a coil $C^2$, the upper end of which is connected with the upper end of the said boiler or still, a liquid-ammonia receiver $C^4$, connected at its upper end with the lower end of the said coil $C^2$, a refrigerator comprising tubes or chambers D, adapted to contain practically the whole of the liquid anhydrous ammonia from the said boiler or still, and a tank E, containing uncongealable liquid in which the said tubes or chambers are immersed near the surface of the liquid, and the bottom of which forms the top or ceiling of the room or chamber to be cooled, a pipe $C^5$, connecting the lower end of the said receiver with the said tubes or chambers D and provided with a cock or valve $C^6$, pipes $D^2 D^3 D^4$, connecting the space above the level of the liquid in said tubes or chambers with the lower end of the said boiler or still and provided with a cock or valve $D'$, and a pipe $C^7$, connecting the lower part of the tubes or chambers D with the boiler or still and provided with a cock or valve $C^8$, all substantially as and for the purposes set forth.

13. In an apparatus for the production of cold by the intermittent ammonia-absorption process, the combination, with an ammonia boiler or still C, of a coil boiler $A'$ for heating the water, situated at a lower level than the said coil-boiler, a separator B, connected at its upper end and lower ends with the corresponding ends of the said coil-boiler pipes $B^3 B^5$, connecting the upper end of the said separator with the upper end of the heating-space of the said ammonia boiler or still, and a pipe $B^8$, connecting the lower end of the said heating-space with the lower end of the coil-boiler, substantially as and for the purpose set forth.

In testimony whereof I have hereunto signed my name in the presence of two subscribing witnesses.

FREDERICK BARKER HILL.

Witnesses:
DAVID YOUNG,
A. E. NIXON.